United States Patent [19]

Chuang

[11] Patent Number: 5,146,951
[45] Date of Patent: Sep. 15, 1992

[54] WATER FAUCET

[76] Inventor: M. J. Chuang, Chang-Chin N Road, Taipei, Taiwan, 111

[21] Appl. No.: 765,021

[22] Filed: Sep. 24, 1991

[51] Int. Cl.$^5$ ............................................. F16K 27/00
[52] U.S. Cl. ..................... 137/594; 137/602; 137/625.4
[58] Field of Search ........... 137/316, 454.2, 454.5, 137/454.6, 602, 607, 625.17, 625.4, 594

[56] References Cited

U.S. PATENT DOCUMENTS

| | | | |
|---|---|---|---|
| 3,169,549 | 2/1965 | Quick | 137/454.6 X |
| 4,676,270 | 6/1987 | Knapp et al. | 137/625.4 |
| 4,733,688 | 3/1988 | Lorch | 137/454.6 |
| 4,804,011 | 2/1989 | Knapp . | |
| 4,805,661 | 2/1989 | Knapp et al. . | |
| 4,884,596 | 12/1989 | Byers et al. . | |
| 4,886,207 | 12/1989 | Lee et al. . | |
| 4,886,210 | 12/1989 | Gaffney et al. . | |
| 4,887,642 | 12/1989 | Bernat . | |
| 4,889,165 | 12/1989 | Newcombe et al. . | |
| 4,967,787 | 11/1990 | Taylor | 137/316 |

*Primary Examiner*—Stephen M. Hepperle
*Attorney, Agent, or Firm*—Bacon & Thomas

[57] ABSTRACT

The present invention relates to an improvement structure of a faucet water inlet, and more particularly to an improvement structure of a faucet water inlet characterized in that the main body of the faucet, the internal component and the water outlet are individually die cast, and at both of the side edges of the internal component and at the position corresponding to the water inlet of the main body, a cold water inlet chamber and a hot water inlet chamber in the form of a vertical differential semicircular cross section are with this construction, it is not only easy to manufacture, but also the product defective rate is reduced. In addition, the main body and the water outlet can be arranged optionally, so that in case of a failure, it does not require to replace all of the components and provide for easy maintenance. Furthermore, by means of the upper and bottom water inlet chamber, the cold water pressure and hot water pressure can be adjusted, and the water flow of the water inlets can be increased as well.

5 Claims, 4 Drawing Sheets

WATER FAUCET

BACKGROUND AND SUMMARY OF THE INVENTION

The present invention relates to an improved a faucet water inlet, and most particulary a faucet structure comprises mainly of a main body, an internal component and a water outlet, which are individually die cast, whereby at one inside wall of the main body on the top side, a hot water inlet is provided, while at the other inside wall of the main body on the bottom side, a cold water inlet is provided; the internal component is divided into three layers, and at the circumference of each layer an o-ring is respectively inserted; at the top a cold water inlet opening, a hot water inlet opening and an outlet opening are provided; at the bottom side edge and corresponding to the locating hole located in the bottom of the main body a locating pin is provided; at the necks of each layer and at the position corresponding to the water inlet of the main body a cold water inlet chamber and a hot water inlet chamber are provided, thus the faucet is not only easy to manufacture, but also can reduce the product defect rate. In addition, the main body and the water outlet can be arranged optionally, so that in case of a failure, it is not required to replace all of the components and provides for easy maintenance. Furthermore, by means of the upper and bottom water inlet chamber, the cold water pressure and hot water pressure can be adjusted, and the water flow of the water inlets can be increased as well.

It is well known that a conventional faucet (refer to FIGS. 1a and 1b is monoblock die cast and consists mainly of a main body (1) and a water outlet (2). A cold water inlet (11) and a hot water inlet (12) is respectively arranged at each side of the main body and an upper orifice plate (13) and a bottom orifice plate (14) are arranged inside the main body, wherein at the top of the upper orifice plate (13) a cold water inlet opening (15), a hot water inlet opening (16) and an outlet opening (17) are respectively provided, and between the upper and bottom orifice plates a blocking plate (18) is extended; and at the joint between the water outlet (2) and the main body (1) an outlet way (21) is arranged and is further connected with the outlet opening (17). Usually such a faucet is suitable for a hand washing basin and should be connected with a water supply pipe. After the cold and hot water have entered the cold water inlet (11) and the hot water inlet (12) located at both sides of the said main body (1), the water will pass through the gaps between the upper orifice plate (13) and the bottom orifice plate (14), and will be further up streamed through the cold water inlet opening (15) and the hot water inlet opening (16), and due to the blockage of the blocking plate (18), the cold and hot water will not be mixed in the space between the upper orifice plate (13) and the bottom orifice plate (14), but must be mixed firstly by the ceramic core (not illustrated) at the top edge of the upper orifice plate (13) and passed through the outlet opening (17) down to the outlet way (21) and flows from the water outlet. Since the faucet is monoblock manufactured and an upper orifice plate (13), a bottom orifice plate (14) and a blocking plate (18) are arranged internally, it will be not only be inefficient for die casting but also time wasting, besides, in case of any part of it is damaged during the casting process, the whole faucet will be useless, thus the product will be easily defective and therefore increase the production costs. Furthermore, the pressures between the cold water and the hot water are different and the cold water pressure is higher than the hot water pressure, therefore, it often happens that the water outlet of cold and hot water is uneven. Besides, since to the outlet opening (17) is smaller than the cold water inlet opening (15) and the hot water inlet opening (16), and the water must be passed through the outlet way (21), the water flow is small and the flow speed is low. Some conventional faucets have been designed to get the water inlet directly from a wall, such as a bath room faucet and a kitchen faucet, although their main bodies and water outlet are of a discrete design, but they are still monoblock die casted and are likely easy to result in the above mentioned disadvantages.

In view of the said problem, the present invention is thus created which consists mainly of a main body, an internal component and a water outlet, which are individually die cast, whereby at one inside wall of the said main body on the top side a hot water inlet is provided, while at the other inside wall of the said main body on the bottom side a cold water inlet is provided; at the bottom side edge a locating hole is provided; the said internal component is divided into three layers, and at the circumference of each layer an o-ring is respectively inserted; at the top a cold water inlet opening, a hot water inlet opening and an outlet opening are provided; at the bottom side edge and corresponding to the locating hole located in the bottom of the said main body a locating pin is provided; at the necks of each layer and at the position corresponding to the water inlet of the said main body a cold water inlet chamber and a hot water inlet chamber are provided in the form of a semicircular cross section.

Therefore, the main object of the present invention is to provide an improvement structure of a faucet water inlet, characterized in that the main body of the faucet, the internal component and the water outlet are individually die cast, and in coordination with the main body and the corresponding positions a cold water inlet, a hot water inlet and water inlet chambers are provided, thus it is not only easy for manufacture, but also can reduce the product defective rate and lower the production costs.

Another object of the present invention is to provide an upper cold water inlet chamber and a bottom hot water inlet chamber in the form of a vertical differential semicircular cross section for adjusting the water pressures, so as to avoid any uneven water outlet of cold water and hot water. At the same time, a bigger water outlet opening can be provided, thus its water flow is larger than those of conventional faucets, and the water outlet comes directly from the outlet opening, without the needs of passing through any outlet way, therefore its flow speed is faster.

A further object of the present invention is to die cast the main body, the internal component and the water outlet individually, so that the main body and the water outlet can be assembled optionally, and in case of any failure, it is not necessary to replace the whole components. Besides, all parts can be disassembled periodically for cleaning, thus it is easy for maintenance.

DETAILED DESCRIPTION OF THE PREFERRED EMBODIMENTS

The above-described and other objects, features and advantages of the present invention will be more apparent from the following description quoted on the basis of annexed drawings as following.

Figure 1B:
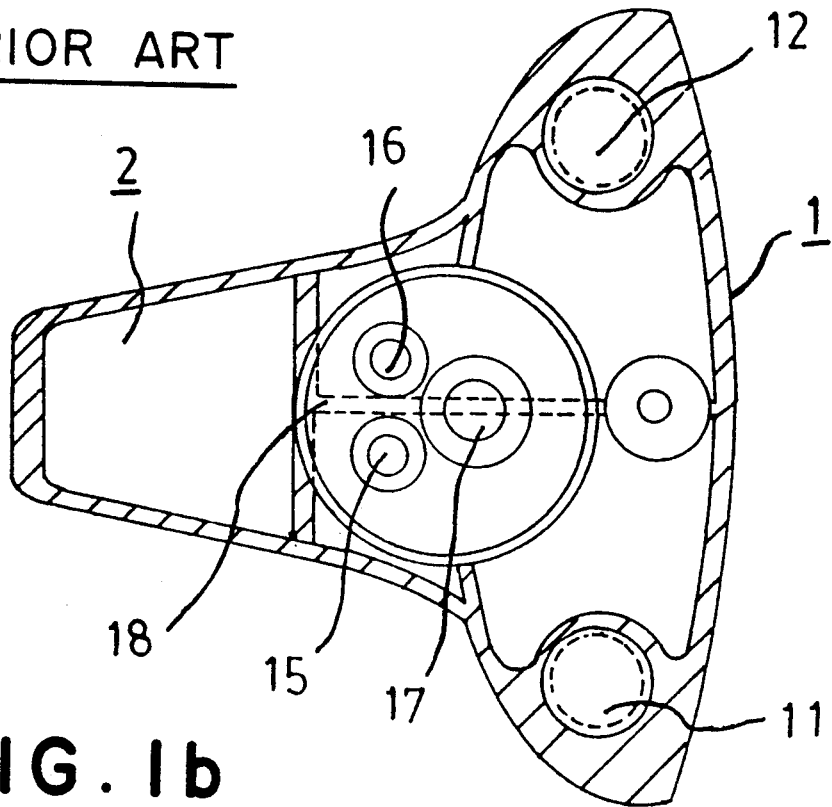
Figure 1A:
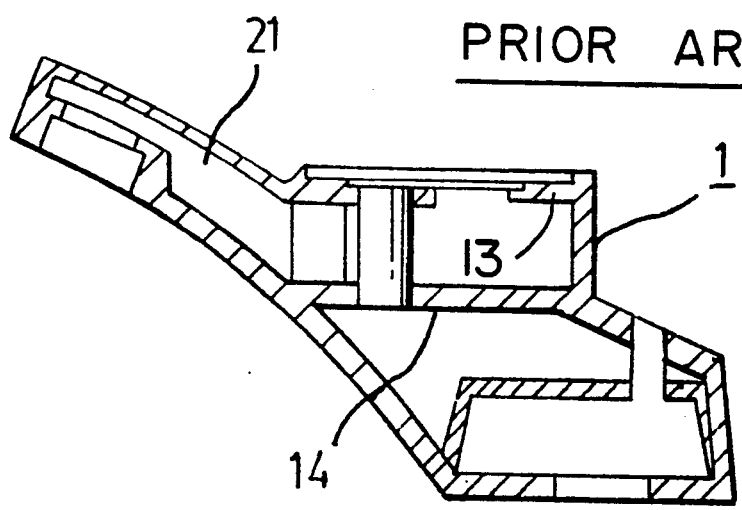
Figure 2:
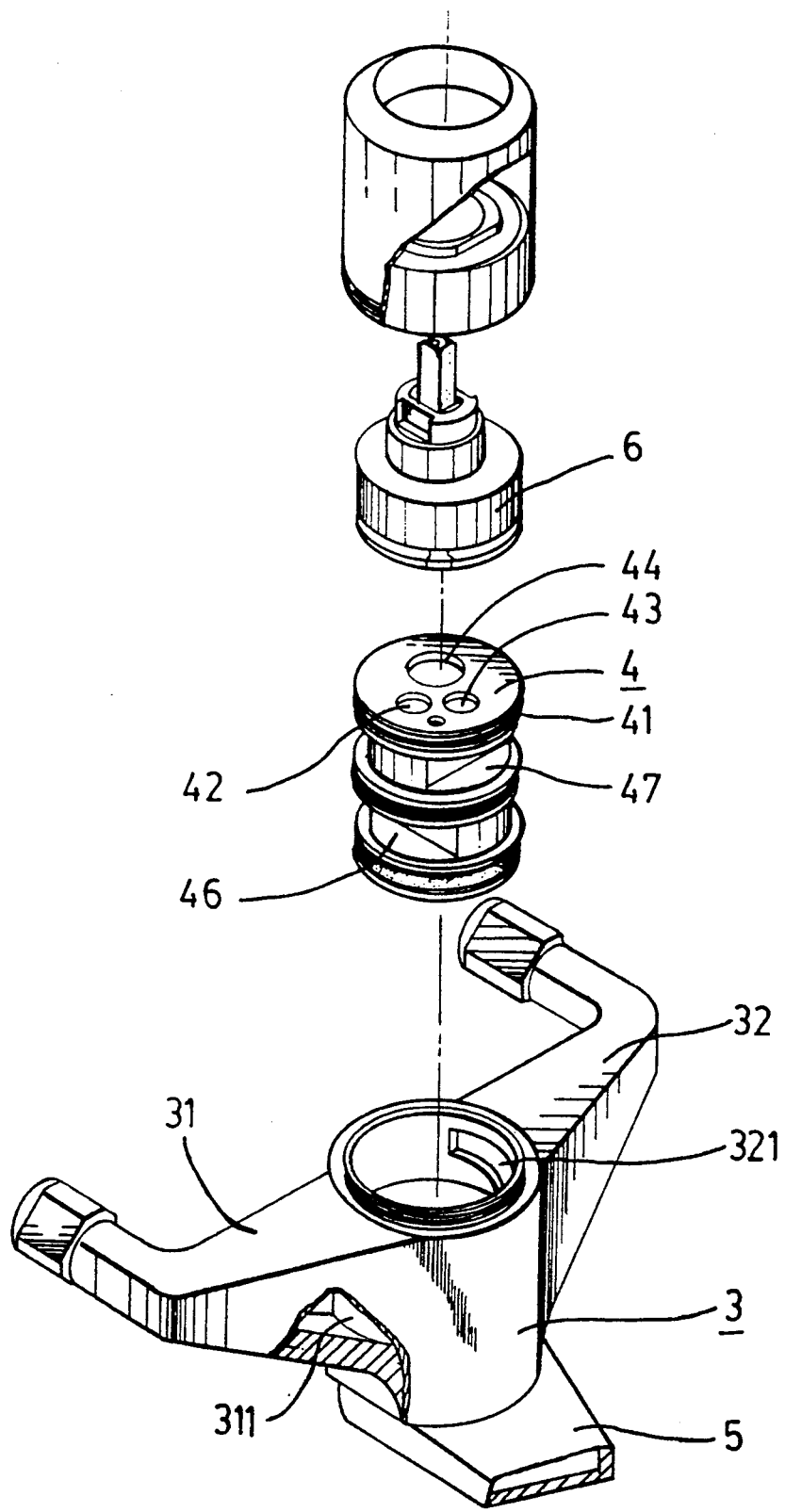
Figure 3:
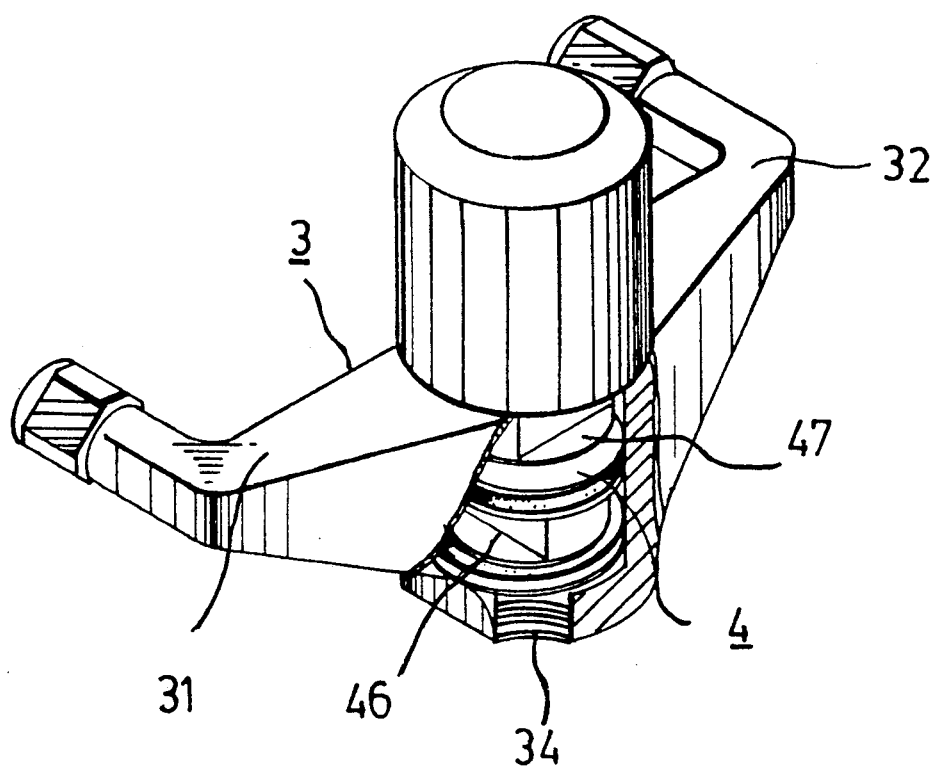
Figure 4A:
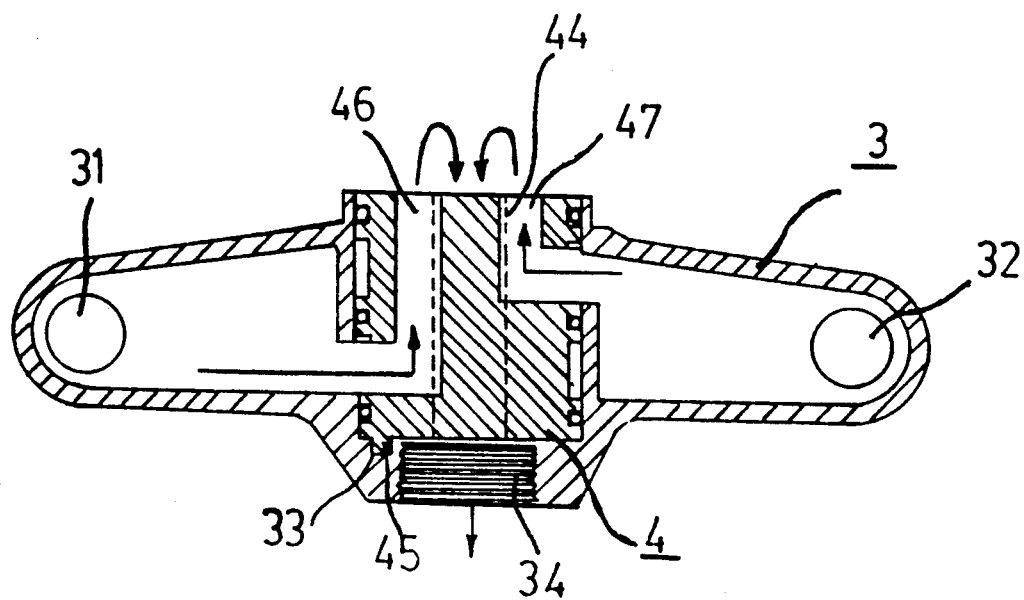
Figure 4B:
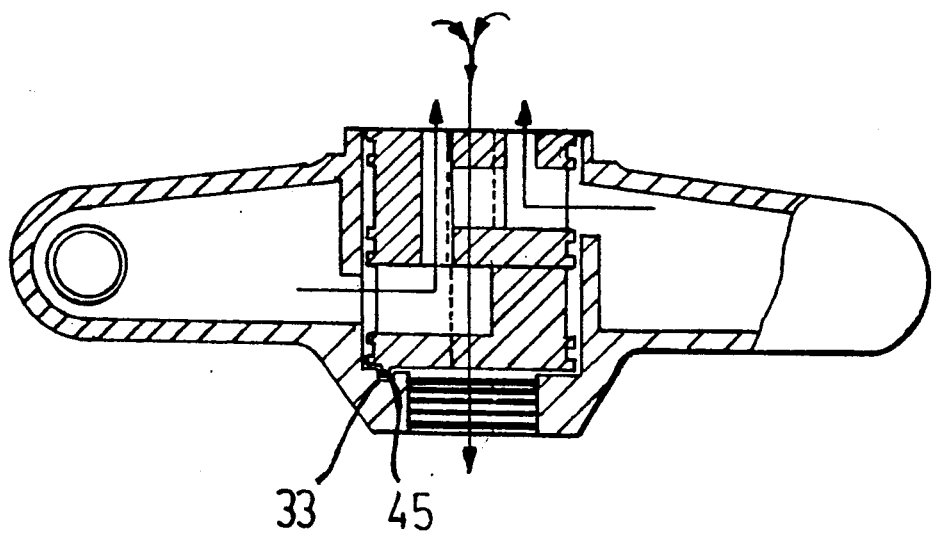

FIGS. 1a and 1b a pictorial constructional view of a conventional faucet;

FIG. 2 an explosive view of the structure of a faucet according to the present invention;

FIG. 3 a pictorial view of a faucet after assembly according to the present invention; and FIGS. 4a and 4b an example of a preferred embodiment of an invented faucet.

DETAILED DESCRIPTION OF THE PREFERRED EMBODIMENT

Referring to FIG. 2, one can clearly see that the present invention of an improved faucet comprises a main body (3), an internal component (4) and a water outlet (5), whereby a cold water inlet return bend (31) and a hot water inlet return bend (32) are monoblock die cast at both the sides of the said main body (3); at one inside wall of the said main body on the top side a hot water inlet port (321) is provided at the corresponding position to the said hot water inlet return bend (32), while at the other inside wall of the said main body on the bottom side a cold water inlet port (311) is provided at the corresponding position to the said cold water inlet return bend (31); at the bottom side edge of the said main body (3) a locating hole (33) is provided and at its outside edge threads (34) are provided (see FIGS. 3 and 4); the said internal component (4) is divided into three layers, and at the circumference of each layer an o-ring (41) is respectively inserted; at the top of the first layer a cold water inlet opening (42), a hot water inlet opening (43) and an outlet opening (44) are provided, and in fact the diameter of the said outlet opening (44) is larger than the cold water inlet opening (42) and the hot water inlet opening (43); at the bottom side edge of the third layer and corresponding to the locating hole (33) located in the bottom of the said main body (3) a locating pin (45) is provided (please refer to FIG. 4); at the necks of each layer and at the position corresponding to the water inlet ports (311, 321) of the said main body (3) a cold water inlet chamber (46) and a hot water inlet chamber (47) are provided in form of a semicircular cross section, which are connected respectively with the said cold water inlet opening (42) and hot water inlet opening (43). For assembly, the internal component (4) will be inserted into the main body (3), and in such a way, that the locating pin (45) located at the side edge of the bottom of the said internal component (4) is inserted in the said locating hole (33) located at the side edge of the bottom of the main body (3), then the cold water inlet chamber (46) and the hot water inlet chamber (47) of the internal component (4) will be automatically adjusted to aim at the cold water inlet port (311) and the hot water inlet port (321) of the main body (3); finally the water outlet (5) will be fixed at the bottom of the main body (3) by means of the threads (34), thus a faucet according to the present invention is completely assembled (please refer to FIG. 3), and the outlet opening (44) is connected to the water outlet (5) directly.

FIG. 4 is an example of a preferred embodiment of the faucet. Since the faucet of the present invention functions by means of water flow, therefore, the hot water switch should be opened first, then open the cold water switch, so that the cold water and the hot water can enter from the cold water inlet return bend (31) and the hot water inlet return bend (32) of the main body (3), pass the cold water inlet port (311) and the hot water inlet port (321) into the cold water inlet chamber (46) and the hot water inlet chamber (47) located at both sides of the internal component (4), then pass through the cold water inlet opening (42) and the hot water inlet opening (43) upstream to the top of the internal component (4), then the cold and hot water will be mixed within a ceramic core (6) (please refer to FIG. 2) and pass through the outlet opening (44) to flow out the water outlet (5). Since the cold water inlet chamber (46) and the hot water inlet chamber (47) located at the sides of the internal component (4) are vertical differentially arranged in form of semicircular cross sections, thus the cold and hot water pressures can be adjusted, and the uneven water outlet from the water outlet (5) can be avoided. Besides, the diameter of the outlet opening (44) is larger and is connected directly to the water outlet (5), therefore, a larger and faster water flow can be assured.

The advantages of the present invention is that the main body (3), the internal component (4) and the water outlet (5) can be individually die cast, so that the main body (3) and the water outlet (5) can be assembled optionally (but limited to with the same diameter), and in case of any failure, it is not necessary to replace the whole components. Besides, all parts may be disassembled periodically for cleaning, thus it is easy for maintenance.

I claim:

1. A water faucet comprising:
    an integral, die cast main component including a hollow main body portion, a cold water supply inlet and a hot water supply inlet, said hollow main body portion having a cold water inlet port aligned with said cold water supply inlet and a hot water inlet port aligned with said hot water supply inlet formed therein; said hollow main body portion including a bottom side having a threaded opening formed therein and a locating hole offset from said opening;
    an integral, die cast internal component adapted to be sealably mounted within said hollow main body portion with a locating pin carried by said internal component being seated in said locating hole, said internal component having an upper surface portion and a lower surface portion, a cold water inlet chamber located between said upper and lower surface portions which is in fluid communication with said cold water inlet port and terminates in a cold water inlet opening formed in said upper surface, a hot water inlet chamber located between said upper and lower surface portions which is in fluid communication with said hot water inlet port and terminates in a hot water inlet opening formed in said upper surface, and an outlet passage extending from said upper surface in fluid communication with said hot and cold inlet openings to said lower surface in fluid communication with said threaded opening; and
    a hollow, die-cast water outlet component threadably secured in said threaded opening of said main component such that said water outlet component is in fluid communication with said outlet passage for the flow of water therethrough.

2. A water faucet as recited in claim 1, further comprising a mixing chamber secured to said main component above the upper surface of said internal component.

3. A water faucet as recited in claim 1, wherein said internal component is divided into first, second and third, vertically spaced layers, said cold water inlet chamber opening into said cold water inlet port between said first and second layers and said hot water inlet chamber opening into said hot water inlet port between said second and third layers.

4. A water faucet as recited in claim 3, further including means for sealing said internal component against said main component at each of said first, second and third layers.

5. A water faucet as recited in claim 1, wherein said outlet passage is sized larger in cross-section than either of said hot or cold inlet openings.

* * * * *